Patented Dec. 19, 1944

2,365,619

UNITED STATES PATENT OFFICE 2,365,619

COMPOSITION FOR PRODUCING FIRE-FIGHTING FOAM AND METHOD OF PREPARING SAME

Thomas J. Bagley, Haddonfield, N. J., and David Levin, Philadelphia, Pa., assignors to R. M. Hollingshead Corporation, Camden, N. J., a corporation of New Jersey No Drawing. Application February 20, 1943, Serial No. 476,618

8 Claims. (Cl. 252—8.05)

The present invention relates to fire-extinguishing foam and it relates more particularly to a certain new and useful composition for producing fire-extinguishing foam.

An object of the present invention is to provide an effective and inexpensive composition for producing fire-extinguishing foam. Another object of the present invention is to provide a composition which, when injected into a rapidly moving stream of water, together with air or the like, will produce an abundant, relatively stable foam capable of forming a thick resistant fire-smothering blanket. Still another object of the present invention is to provide a process for preparing said composition.

Other objects and advantages of the present invention are apparent in the following detailed description and appended claims.

One commonly used method of extinguishing conflagrations involves smothering fire by blanketing it with a coating of relatively stable foam. This method is employed particularly where the burning material is a liquid (such as petroleum or the like) lighter than water and relatively immiscible therewith so that water alone would not extinguish the fire but would merely collect beneath the surface of the burning material. The fire-fighting foam thus used may be either a "chemical foam" (a foam in which the gas is carbon dioxide or other similar gas, produced by chemical interaction of the constituents of the foam-producing material) or an "air foam" (in which the gas is air which has been mechanically intimately mixed with the water by an injector or jet pump or the like; the foam-producing and stabilizing substance being added to the material at generally the same time to create a thick relatively long-lasting foam).

While several foam-producing and foam-stabilizing substances and compositions have been suggested in the past for producing an "air foam," they have all been more or less unsatisfactory in that the foam produced was inadequate in quantity and stability.

The novel foam-producing and foam-stabilizing composition of our present invention and our process for producing said composition for the first time provide an inexpensive and easy way to prepare a fire-fighting foam which is thick and copious and which is long-lasting.

According to the process forming part of our present invention, we first partially hydrolyze animal or vegetable glue or gelatin or other similar albuminous or proteinaceous materials which, in water, form a protective colloid to stabilize the foam. We have found that the use of such hydrolyzed material in place of the unhydrolyzed material used in the previously-known foam-producing compositions gives a much more efficient product since it is possible to incorporate a considerably larger amount of the glue or gelatin or the like into the finished solution without appreciably increasing the viscosity of the same.

We have found that the partial hydrolysis of the glue or gelatin may be carried on most effectively by using a water-soluble nitrite such as sodium nitrite, potassium nitrite, or ammonium nitrite, particularly sodium nitrite.

By way of illustration but not restriction, we may "dissolve" one pound of solid glue, free from oil, in one pint of boiling water (while the expression "dissolve" is commonly employed to describe this step, the product is not a true solution but is, instead, a hydrophylic colloid). The mixture is then cooled at 60° C. and if, (as is usually the case) it is acidic, it should be adjusted to a pH of approximately 8 by the addition of sodium hydroxide, potassium hydroxide or sodium carbonate.

After the mixture has been adjusted to a pH of approximately 8, enough sodium nitrite is added to give approximately 5 to 10 per cent sodium nitrite in the solution. The mixture is then kept at approximately 60° C. for about one hour and thereafter cooled to room temperature.

We have found that by following this procedure carefully, we obtain a concentrated glue solution without formation of a jell and without separation of a precipitate (which commonly separates out when glue is hydrolyzed).

The hydrolyzed glue solution thus prepared is not only more concentrated than what can be prepared from ordinary unhydrolyzed glue, but is also considerably less affected by salt water. This is of particular value when the foam-producing material is to be used on ocean-going ships were the fire-fighting foam is produced by injecting the foam-producing substance into sea water.

The use of nitrites, particularly sodium nitrite, in hydrolyzing the glue or gelatin or other protein to render it more soluble in water affords other advantages as well.

Thus, the presence of the nitrite causes a depression of the freezing point of the solution and prevents the solution from freezing up in cold weather (the efficacy of the mixture as a foam-producing material being greatly impaired by freezing).

The presence of the nitrite, particularly sodium nitrite, also produces a corrosion-inhibiting action which is highly desirable where the foam-producing substance and the foam itself are used in contact with metal tanks, pipes, injectors, and the like.

The presence of the nitrite also gives a preservative action and prevents mold or bacterial decomposition of the organic constituents.

The hydrolyzed glue solution may, thereafter, be mixed with suitable organic wetting agents such as sulfonated vegetable or mineral oils which lower the surface tension and thus produce an abundant foam. Examples of organic wetting agents which may be used include sodium sulfonaphthanate (sodium naphthalene sulfonate), sodium lauryl sulfonate or commercial sulfonated mixtures of fatty acid salts or of petroleum hydrocarbons. In place of the organic wetting agents described above, we may employ soaps or other saponaceous materials capable of producing an abundant foam.

The final foam-producing composition contains from 4 to 8 per cent of solid glue. We have found that a composition containing approximately 6 per cent of solid glue is particularly effective.

The novel foam-producing composition of the present invention may be used to produce an "air foam" with any conventional Venturi-type or other type injector, such as, for example, the injectors shown in the United States patents to Fox 889,516 and Boetcher 801,641; the injector operating in conventional and well-known manner to suck in air and the foam-producing material being added to the stream of water preferably just before or just after the injector.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

As used in the appended claims, the expressions "dissolve," "dissolving," and "solution" are intended to cover more or less fluid hydrophilic colloidal solutions of glue, gelatin and other albuminous and proteinaceous materials as well as true solutions.

Having thus described the invention, what is hereby claimed as new and desired to be secured by Letters Patent is:

1. A process for preparing a foam-forming material comprising preparing an aqueous solution of proteinaceous material, hydrolyzing the proteinaceous material with a water-soluble nitrite, and thereafter adding a saponaceous material.

2. A process for preparing a foam-forming material comprising preparing at a relatively elevated temperature an aqueous solution of proteinaceous material capable of forming a hydrophilic colloid, hydrolyzing the proteinaceous material with a water-soluble nitrite at a temperature somewhat below the dissolving temperature, cooling the solution of hydrolyzed proteinaceous material, and thereafter adding a saponaceous material.

3. A process for preparing a foam-forming material comprising dissolving a proteinaceous material in boiling water, reducing the temperature to approximately 60° C., adding a water-soluble nitrite, maintaining the mixture at approximately 60° C. for about one hour, cooling, and thereafter adding a saponaceous material.

4. A process for preparing a foam-forming material comprising preparing at a relatively elevated temperature an aqueous solution of a member of the group consisting of animal glue, vegetable glue and gelatin, adjusting the pH of the solution to slight alkalinity, heating said solution at a somewhat reduced temperature with a water-soluble nitrite, and cooling said solution to provide a generally clear non-jelled concentrated solution of hydrolyzed proteinaceous material having a freezing point appreciably below 0° C., having relatively slight corrosive action and being relatively resistant to mold and bacterial action.

5. A foam-forming material capable of producing a copious relatively stable air-foam with water, said material comprising a clear non-jelled concentrated aqueous solution of at least partially hydrolyzed proteinaceous colloid-forming material containing a dissolved water-soluble nitrite, said solution having a freezing point appreciably below 0° C., having relatively slight corrosive action and being relatively resistant to mold and bacterial action.

6. A foam-forming material capable of producing a copious relatively stable air-foam with water, said material comprising a clear non-jelled concentrated aqueous solution of at least partially hydrolyzed proteinaceous colloid-forming material containing a dissolved water-soluble nitrite, and a dissolved saponaceous material, said solution having a freezing point appreciably below 0° C., having relatively slight corrosive action and being relatively resistant to mold and bacterial action.

7. A foam-forming material capable of producing a copious relatively stable air-foam with water, said material comprising a clear non-jelled 4 to 8% aqueous solution of at least partially hydrolyzed proteinaceous colloid-forming material containing a dissolved water-soluble nitrite and a dissolved saponaceous material, said solution having a freezing point appreciably below 0° C., having relatively slight corrosive action and being relatively resistant to mold and bacterial action.

8. A foam-forming material capable of producing a copious relatively stable air-foam with water, said material comprising a clear non-jelled aqueous solution formed by hydrolyzing dissolved proteinaceous colloid-forming material with a water-soluble nitrite at a somewhat elevated temperature, and thereafter dissolving a saponaceous material in the cooled solution, said foam-forming material containing 4 to 8% of the proteinaceous colloid-forming material, and having a freezing point appreciably below that of water and having a relatively slight corrosive action and being relatively resistant to mold and bacterial action.

THOMAS J. BAGLEY.
DAVID LEVIN.